March 23, 1943.    R. A. HINKLEY    2,314,826
METHOD AND APPARATUS FOR PERFORATING GLASS ARTICLES
Filed May 14, 1940    4 Sheets-Sheet 1

INVENTOR.
RAY A. HINKLEY
BY
ATTORNEY.

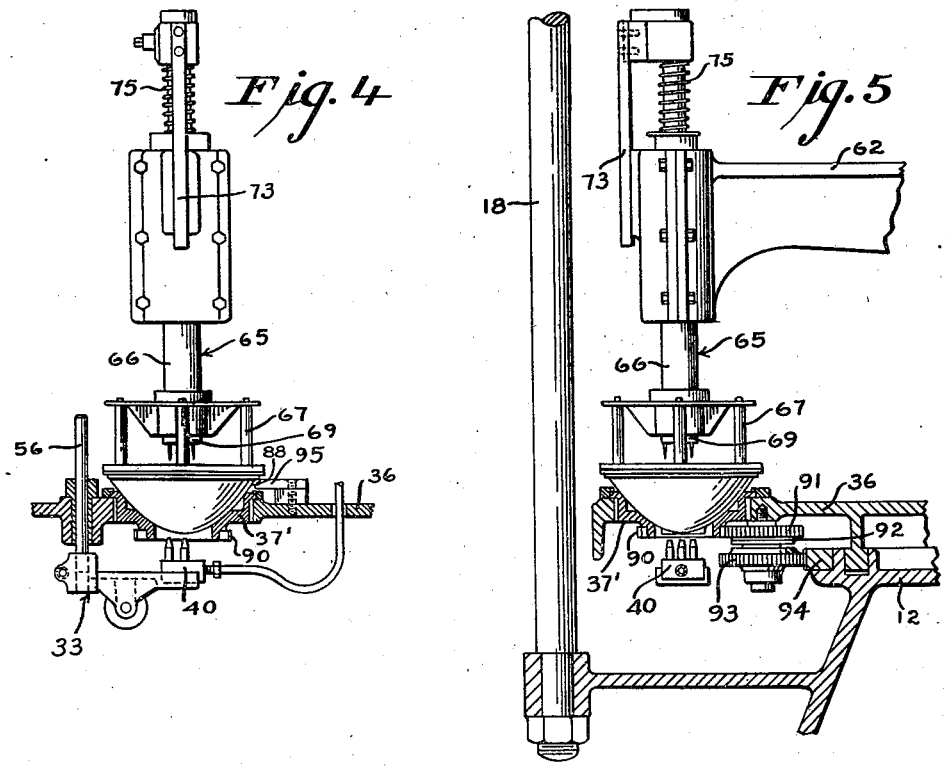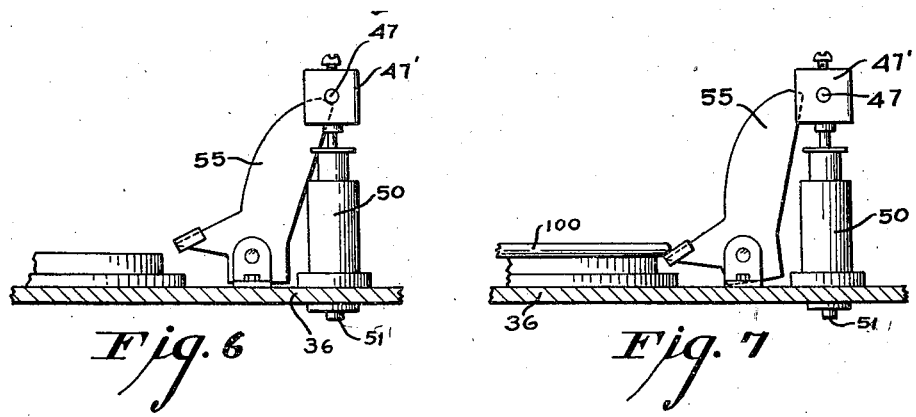

Patented Mar. 23, 1943

2,314,826

UNITED STATES PATENT OFFICE 2,314,826

METHOD AND APPARATUS FOR PERFORATING GLASS ARTICLES

Ray A. Hinkley, Corning, N. Y., assignor to Corning Glass Works, Corning, N. Y., a corporation of New York Application May 14, 1940, Serial No. 335,185

11 Claims. (Cl. 49—28)

The present invention relates to methods of and apparatus for perforating glass articles. Prior methods of perforating, insofar as known to applicant, involve perforation by use of abrasives or, alternately, the application of heat in conjunction with the use of various forms of tools. This invention is concerned with improvements involving the latter form of perforating methods. It has been the ordinary practice in the use of heat in the perforation of glass articles to direct a highly concentrated needle-like flame at the surface to be perforated, to then force a prod into the softened glass to draw out or form a stocking or horn. The glass for some distance surrounding this stocking or horn is to some extent distorted by the drawing action, but there has been no particular objection to this in the forms of ware perforated in the past. The stocking or horn, as it is called, is of course very thin, sets up rapidly because of the cooling action of the prod, and is readily broken through to complete the perforation. However, the glass surrounding a perforation made in this fashion is thin, jagged, and full of surface checks.

As heretofore mentioned, in the character of ware perforated in the past the slight distortion of the glass surrounding the aperture has not proven objectionable. However, more recently articles for use as reflectors and the like have been pressed to a highly accurate optical contour, and, as will be appreciated, perforation of this type of ware by methods which distort the glass surrounding the perforations is unsatisfactory. It is with a view to the perforation of ware of the latter character that the perforating method hereinafter described has been developed.

The principal object of the present invention, as will be appreciated from the foregoing, is a method of perforating glass articles in such a manner that the surfaces surrounding the perforations will not be damaged or their contour altered.

Another object is a simplified method of perforating glass articles.

A still further object is an apparatus by means of which the foregoing method may be rapidly and economically performed.

In the method embodying the present invention high heat intensity needle-like flames are directed against the article until they actually pierce the glass, so that that glass which is melted away to produce the perforation is at once drawn to the surrounding glass by surface tension. In the production of an aperture in this fashion there is no strain set up which would tend to draw or distort the glass surrounding the aperture. The size of the aperture so produced is then very readily modified to a desired standard size and shape by employing a suitable prod.

An apparatus embodying the present invention is illustrated in the accompanying drawings and consists of a base carrying a rotating table on which are mounted six supports for articles to be perforated with a hole perforating burner assembly arranged under an opening surrounded by each support. This assembly, under the influence of a suitable cam, is periodically raised into operative range of a supported article, and has a cam controlled burner fuel supply valve which is opened for a time represented by a distance of its travel necessary to perforate the article. The structure also includes a device arranged over each support having hole reshaping and resizing prods and which is lowered to perform the reshaping and resizing operation by a pneumatically operated mechanism following perforation by the burners. Devices for holding the articles on their supports during the withdrawal of hole resizing and reshaping prods are also provided and are actuated by a suitable cam track.

In an alternative form of the invention the ware supports are mounted for rotation about their own axes until articles deposited thereon are oriented in a particular position with respect to the perforating and hole resizing equipment; otherwise this operation must be performed manually.

Fig. 1 of the accompanying drawings is a side elevational view of the apparatus as designed for use in perforating glass articles now extensively employed as reflectors for automobile headlight and flood light assemblies.

Fig. 2a is a view of a fragmentary portion of the apparatus with certain parts in their alternative position from that in which they appear in Fig. 2.

Figs. 4 and 5 are fragmentary views, partly in section, of the apparatus as modified to rotate the supports about their own axes to effect orientation of the articles thereon with respect to the hole perforating equipment.

Figs. 6 and 7 are fragmentary views illustrating a ware operated lever in its normal and operated positions.

Figure 1:
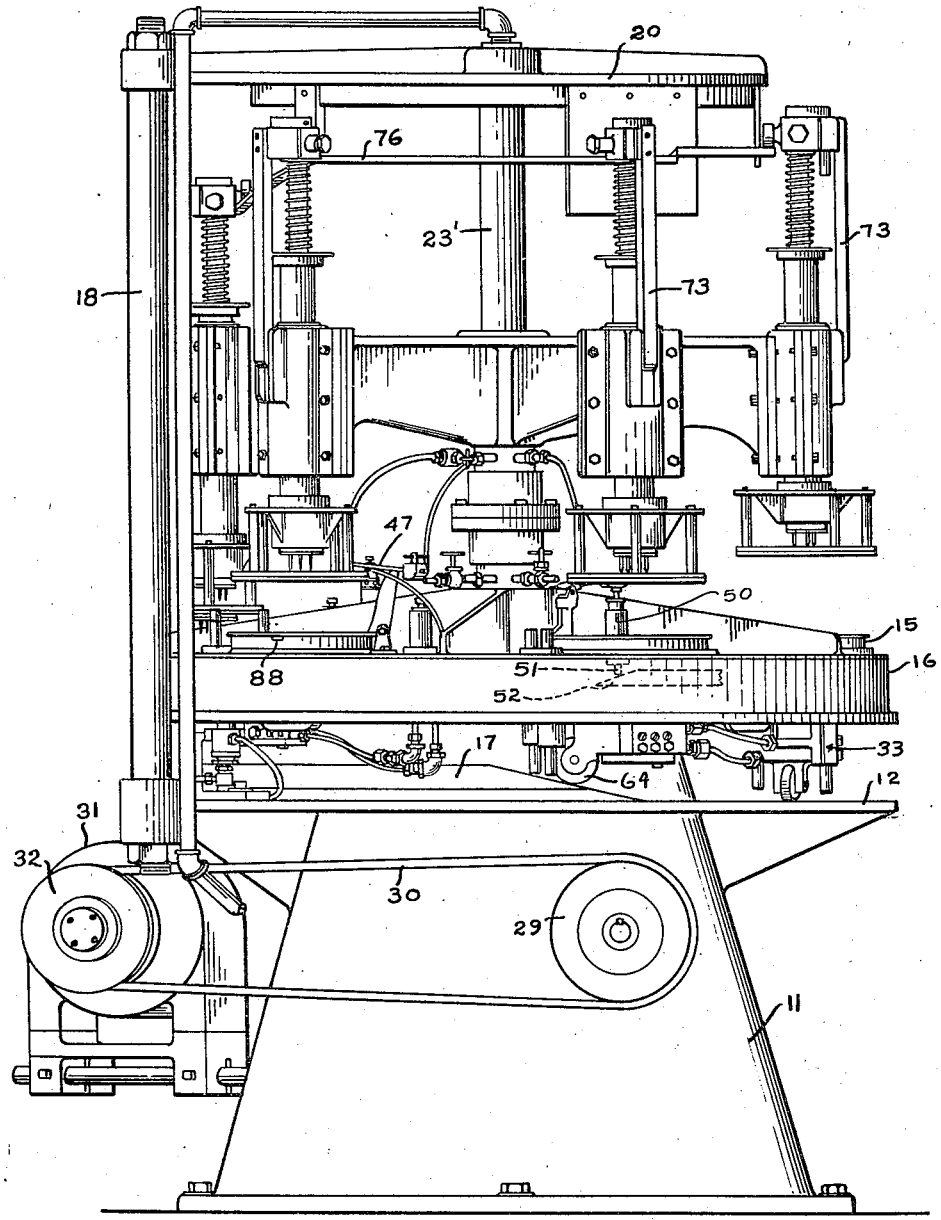
Figure 3:
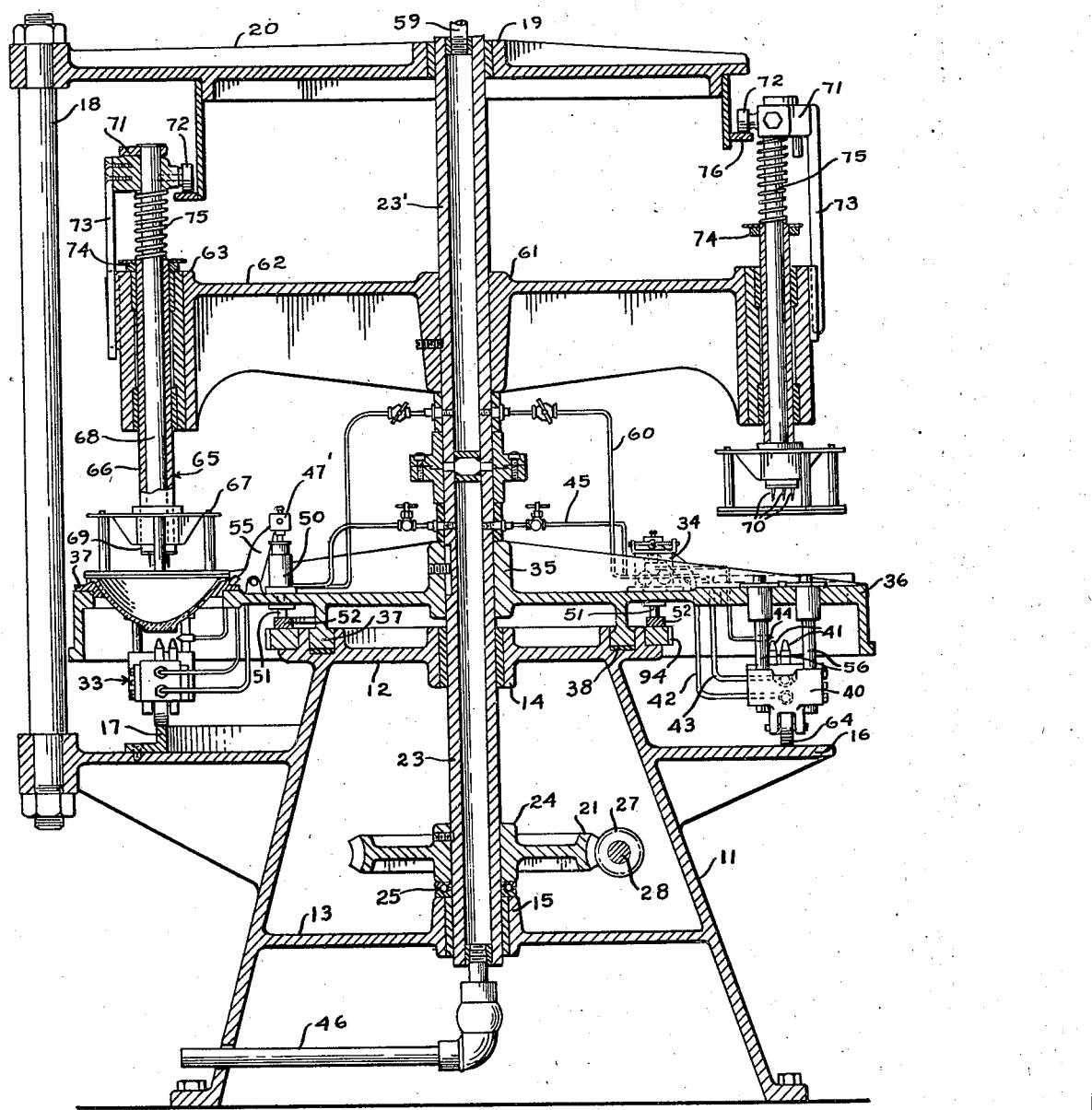
Fig. 3 is a sectional elevation of the apparatus.

The stationary framework of the apparatus comprises a base 11 having the general shape of a truncated cone with head and partition members 12 and 13 (Fig. 3) provided with vertically aligned bearing housings 14 and 15. The exterior of the base wall has integral therewith a surrounding ledge or table 16 which supports a burner elevating cam track 17, and has suitable apertured lugs in which are held columns 18 carrying an overhead casting 20 having a bearing housing 19 axially arranged over bearing housings 14 and 15. Passing through suitable bearings arranged in housings 14 and 15 is a shaft 23 which near its lower end has keyed thereto a worm wheel 21 having a hub 24 supported on a thrust bearing 25 resting on the housing 15. The shaft 23 is adapted to be continuously rotated through the medium of worm wheel 21 and a worm 27 carried on one end of a drive shaft 28. The other end of this drive shaft carries a pulley 29 (Fig. 1) driven by a belt 30 from a motor 31 provided with a variable speed drive pulley assembly 32.

The shaft 23, at a point slightly above the housing 14, passes through and is keyed to the hub 35 of a casting 36. A depending portion 37 of this casting rests on a suitable bearing ring 38 in a groove in the top surface of head member 12 of the base. The casting 36 has six equally spaced openings about its periphery for accommodating six article supports 37 which are fixed to the casting. At each such location there is also provided a burner assembly 33 and an associated burner control valve 34.

Each burner assembly consists of a fuel mixing box 40 provided with hole burning nozzles 41, supplied with the necessary fuel and gas for supporting combustion by flexible tubes 42 and 43 extending from the control valve 34. This valve receives premixed air and gas from a supply line 46 via the bore of shaft 23 and a tube 45, and a supply of oxygen through a tube 60 from a supply line 59 via the bore of a tubular shaft 23' forming an extension of tubular shaft 23.

The valve 34 is provided with an operating arm 47 carrying a weight 47' which tends to hold the valve open. There are, however, two pieces of apparatus which are at times in position to hold the valve closed against the action of this weight. One of these is an assembly 50 having a plunger 51 adapted to be raised by a cam track 52 into engagement with weight 47' to lift the valve arm to closed position. When such arm has been lifted to closed position the other referred to apparatus, best shown in Figs. 6 and 7, becomes effective. This other apparatus comprises a bell crank 55 having its upper arm moved by the force of gravity into the downward path of movement of valve arm 47 and when in such position will prevent the weight 47' from lowering arm 47 when the plunger 51 rides off cam 52. The lower arm of bell crank 55 is so located with respect to the article support that an article 100 deposited on the support encounters the lower arm of the bell crank and rotates it sufficiently to clear its upper arm from the path of movement of valve arm 47. Consequently the valve is opened under control of cam track 52 and plunger 51 only when there is an article on the support. The fuel mixture issuing from the burner nozzles 41 is lighted by fire from a suitable pilot burner 44.

The burner assembly 33 has a supporting roller 64 resting on table 16 or, alternatively, on the burner elevating cam track 17; and is properly oriented with respect to the article support by means of guide posts 56 (Fig. 3) at their lower ends rigidly secured to the burner assembly 33 and with their free ends slidably arranged in suitable bearings in casting 36. As will be evident, the cam track 17 functions to raise each burner assembly to bring its hole burning nozzles into the most effective operating range of an article on the associated support.

Carried by shaft 23' is a spider 61 having an arm 62 for each article support and having a housing 63 at its free end in which there is carried an assembly, generally designated 65, arranged in axial alignment with the article support. In the assembly 65 a tubular shaft 66 passes through suitable bearings arranged in housing 63 and carries at its top end a supporting ring 74 and at its bottom end an article hold-down device 67. A solid shaft 68 passes through the bore of shaft 66 and at its lower end is provided with a chuck 69 holding hole resizing and reshaping prods 70. The shaft 68 at its top end has fixed thereto a block 71 supporting a roller 72 and a guide member 73. Surrounding shaft 68 in the space between ring 74 and block 71 is a spring 75 which normally holds the lower end of shaft 66 against the top of the prod holding chuck 69, in which position the prods 70 are well above the lower extremity of the article hold-down unit 67.

Figure 2:
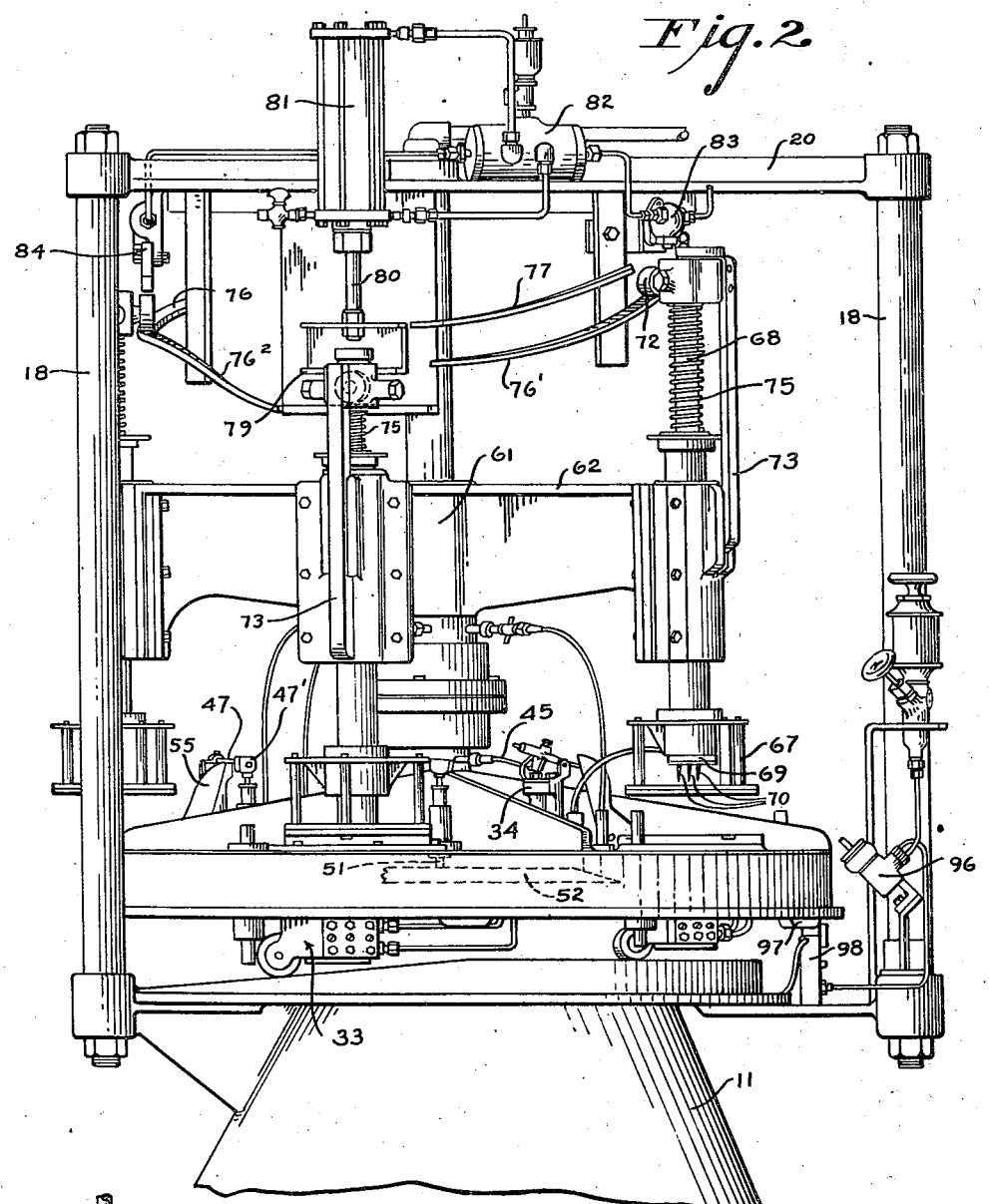
Fig. 2 is another side elevational view of the apparatus.

The guide member 73 is slidably arranged in a vertical groove in the outside wall of housing 63 and functions to prevent accidental turning of shaft 68 about its own axis to insure maintenance of the prods 70 in axial alignment with perforations burned through an article resting on the associated article support 37. The entire assembly 65 is supported most of the time through the medium of its roller 72 which rests on a track 76 (Fig. 1) suitably suspended from the overhead casting 20. For approximately two-thirds its length this track is substantially level and at a height maintaining the hold-down device 67 of the assembly 65 well above its associated article support, as best illustrated in the right hand portions of Figs. 1 and 3, enabling the convenient placement on or removal of an article from a support. A subsequently encountered portion 76' of track 76 (Fig. 2) declines sufficiently to enable the article hold-down assembly 67 to be lowered into engagement with an article on the support, as illustrated in the left hand portion of Fig. 3. This is a prerequisite to the hole reshaping and resizing operation to guard against an article being lifted from its support upon withdrawal of the prods 70 from the resized and reshaped apertures.

To effect the resizing and reshaping operation there is provided a movable track section 79, shown in its normal position in Fig. 2a, and under which the roller 72 of an assembly 65 travels after passing off the end of track portion 76'. An auxiliary track 77 is arranged above the track 76' to force any roller 72 downward against the tension of its spring 75 should this be necessary to bring a roller below the bottom level of track 79. This track is carried by a rod 80 adapted to be actuated by a piston within an associated pneumatic cylinder 81. Air for lowering and raising track 79 is alternately supplied to the upper and lower end of cylinder 81 by a control valve 82 in turn under influence of pilot valves 83 and 84. Air is supplied to the upper end of the cylinder when a roller 72 passes under and actuates pilot valve 83 and is supplied to the lower end of the cylinder when a roller 72 passes under and actuates pilot valve 84. Both of these operations occur well before the roller 72 of an assembly 65 has traveled the length of track 79. This track in its downward movement cannot lower the hold-down assembly 67 as this is already in engagement with an article which, as will be brought out subsequently, has before this time been perforated by flames from the associated burner nozzles. The lowering of the shaft 68 is, however, effected against compression of spring 75 and the prods 70 thus advanced through the perforations in the article. As soon as the track 79 is restored the spring 75 functions to restore shaft 68 to its up-position with respect to the hold-down device 67. After a slight distance of travel beyond track 79 an inclined portion $76^2$ of track 76 is engaged by the roller 72 and becomes effective to raise the entire assembly 65 to its initial height.

A cycle of operation is briefly as follows: After restoration of the assembly 65 to its initial height an attendant removes a finished article from the associated support 37 and places a fresh article thereon. After approximately 120° of travel following the restoration of the assembly 65, roller 64 of the burner assembly encounters the inclined portion (Fig. 1) of track 17 and is thus raised into operative relation with the article. At the same time plunger 51 rides off track 52, permitting the weight 47' to open the valve 34 thus rendering the burner active, providing, of course, that an article has been deposited on the support to move lever 55 clear of the arm 47. By the time the assembly reaches the portion 76' of track 76 (Fig. 2) the burner has been active long enough to perform its perforating operation and valve control plunger 51 again encounters track 52 which lifts the plunger to cut off the fuel supply to the burner. This prevents waste of fuel, unnecessarily prolonged exposure of the glass to the flames, and also possible damage to the prods 70 by the flames. As the assembly travels down the track portion 76' the hold-down device is brought to rest on the article, lowering and raising of the prods takes place and the parts are restored after roller 72 leaves track 79, as already described, enabling an attendant to remove a perforated article and replace it with a fresh one. It may be well to call attention to the fact that the attendant in placing an article on a support brings a lug 88 (Fig. 1) of the article into register with a notch in the support to properly orient the article therein.

In the alternative form of structure (Figs. 4 and 5) each article support 37' is free to rotate about its own axis and has a depending portion to which is fixed a gear 90. This gear is in mesh with a pinion 91 driven through a disc clutch 92 by a pinion 93 permanently in mesh with a ring gear 94 carried by the peripheral flange of head member 12. As will be evident, as the casting 36 rotates, the pinion 93 rotates about the ring gear 94 and, through the described arrangement rotates the article support about its own axis. An orienting bar 95 is mounted on casting 36 adjacent each support in the path of rotation of the lug 88 of an article placed on the support and, accordingly, an article is rotated only until the lug 88 encounters bar 95 after which clutch 92 slips allowing the article to remain in its oriented position. In other respects, the operations are the same as already described.

Under certain circumstances it is desirable to lubricate the prods 70 and to accomplish this a spray gun 96 (Fig. 2) is mounted in position to direct a spray of lubricant onto the prods as they pass within range of the gun. During such time a cam 97 engages and actuates a gun control valve 98 for this purpose.

I claim:

1. In a glass working apparatus, a rotatable unit having supports for glass articles to be perforated arranged equidistant from one another and from the axial center of said unit, assemblies for thermally perforating glass articles arranged on the respective supports, a device rendering said assemblies active in sequence during the rotation of said unit, and means associated with each support for rendering said device ineffective unless the support is occupied.

2. In a glass working apparatus, a rotatable table with supports arranged about its periphery for a series of glass articles to be perforated, hole, burner assemblies carried by said table and arranged under the respective supports, hole reshaping mechanisms arranged over the respective supports and movable in unison therewith as the table is rotated, means for raising the burner assemblies during a predetermined portion of a revolution of said table, means for rendering said burners active only when in their raised position, and means for actuating said reshaping mechanisms after their associated burners have become inactive.

3. An apparatus for perforating glass articles which includes an article support, burners for directing flames in number corresponding to the number of perforations to be made through an article, means for moving said burners from a position of rest to a position for burning perforations through an article resting on said support and for maintaining said burners in the latter position for a predetermined time ample to burn perforations through the article, means rendering said burners operative only while in the latter position, and devices for imparting uniformity and size to the perforations while the glass is still plastic from the perforating operation.

4. In a glass working apparatus, a rotatable table, a series of supports for articles to be perforated arranged in a circle concentric to the axis of said table, hole burner units carried by said table and arranged beneath said supports, means for periodically raising each unit into juxtaposed relation to its associated support, valves for rendering the respective burner units active, means operating said valves only when their burner units are in their raised position, and means for rendering the latter means ineffective unless the associated supports are occupied.

5. In a perforating apparatus, a device having a plurality of perforating assemblies associated therewith each including an article support, a hole perforating burner, a valve normally tending to feed fuel to said burner, means for igniting fuel supplied to said burners, and a device to prevent operation of the valve if the support is unoccupied; means common to said assemblies for successively moving the burners from an inactive to active relation with respect to articles resting on the supports, and other means also common to said assemblies for successively permitting operation of the valves only provided their associated supports are occupied.

6. In a perforating apparatus, a support for a glass article to be perforated, a hole perforating burner arranged below an article resting on said support, a pilot associated with said burner for igniting fuel supplied thereto, a valve for controlling the supply of fuel to said burner having an operating arm biased to open said valve, a device for holding said arm in position to hold its valve closed, means for periodically removing said device from the path of movement of said arm, and a lever in the operating path of said arm adapted to be removed from such path by an article placed on said support.

7. In an apparatus for perforating symmetrically shaped glass articles, a plurality of devices each for supporting an article about its periphery, means for rotating each of the respective devices about the axial centers of articles supported thereon, hole perforating units associated with said devices, and means cooperative with each device and the article resting thereon to stop rotation of the device when it has rotated sufficiently to orient the supported article in a predetermined position with respect to the associated perforating device.

8. A glass working apparatus which includes a glass article support, an assembly associated with said support for perforating an article resting thereon, means to move said support relative to said assembly to orient an article on the support in a particular position relative to said assembly, and means cooperative with an article placed on said support to stop movement thereof when orientation of the article has been effected.

9. The method which includes directing a highly concentrated flame against one side of a wall of a glass article until an aperture is burned completely therethrough solely by the heat and pressure of the flame, immediately removing the flame and introducing a shaping and resizing tool into the perforation from the opposite side of the wall while the glass surrounding the aperture is still plastic.

10. In a perforating apparatus, a support for a glass article to be perforated, a burner assembly associated with said support, means for so moving the burner with respect to said support as to direct at close range a flame against a surface of an article resting thereon for a predetermined time and for then restoring the burner to its initial position, mechanism associated with said support including a prod arranged in coaxial alignment with the flame and directed toward the article, and means operated following the expiration of said predetermined time period to advance said prod through a plane defining the boundary of the article surface which was heated and the plane defining the original surface opposite thereto.

11. An apparatus for perforating glass articles which includes an article support, burners for directing flames in number corresponding to the number of perforations to be made through an article, means for moving said burners from a position of rest to a position for burning perforations through an article resting on said support and for maintaining said burners in the latter position for a predetermined time ample to burn perforations through the article, means rendering said burners operative only while in the latter position, devices for imparting uniformity and size to the perforations while the glass is still plastic from the perforating operation, a mechanism for applying a lubricant to said devices, and means for operating said mechanism prior to an operation of said devices.

RAY A. HINKLEY.